(12) United States Patent
Flanders

(10) Patent No.: US 6,554,496 B1
(45) Date of Patent: Apr. 29, 2003

(54) SYSTEM AND METHOD FOR COUPLING BEAMS INTO OPTICAL SYSTEM ACROSS HERMETIC BOUNDARY

(75) Inventor: Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 68 days.

(21) Appl. No.: 09/711,808

(22) Filed: Nov. 13, 2000

Related U.S. Application Data

(60) Provisional application No. 60/165,431, filed on Nov. 15, 1999.

(51) Int. Cl.[7] .................................................. G02B 6/36
(52) U.S. Cl. .............................. 385/94; 385/88; 385/93
(58) Field of Search ..................................... 385/88–94

(56) References Cited

U.S. PATENT DOCUMENTS

| | | | | |
|---|---|---|---|---|
| 5,093,879 A | * | 3/1992 | Bregman et al. | 385/93 |
| 5,359,208 A | | 10/1994 | Katsuki et al. | 257/82 |
| 5,519,798 A | | 5/1996 | Shahid et al. | 385/65 |
| 5,675,685 A | * | 10/1997 | Fukuda et al. | 385/89 |
| 5,687,267 A | * | 11/1997 | Uchida | 385/137 |
| 5,745,625 A | * | 4/1998 | Aikiyo et al. | 385/33 |
| 5,815,624 A | * | 9/1998 | Rosenberg | 385/115 |
| 5,943,463 A | * | 8/1999 | Unuma et al. | 385/119 |

FOREIGN PATENT DOCUMENTS

| | | | | |
|---|---|---|---|---|
| DE | 43 42 840 A1 | 6/1995 | | G02B/6/43 |
| DE | 196 13 755 A1 | 10/1997 | | G02B/6/32 |
| EP | 0 415 094 A2 | 3/1991 | | G02B/6/42 |
| EP | 0 785 456 A1 | 7/1997 | | G02F/1/09 |
| EP | 0 933 656 A2 | 8/1999 | | G02B/6/12 |
| EP | 1 033 595 A1 | 9/2000 | | G02B/6/38 |
| WO | 00/65396 | 11/2000 | | G02B/6/42 |

OTHER PUBLICATIONS

Göring, R., et al., "Integration Process Optimization of a Micro–Optical 1 X N Fiber Optic Switch," *Proceedings of SPIE, vol. 3952*:339–345 (2000).

Han, H., et al., "Integration of Silicon Bench with Micro Optics," *Proceedings of the SPIE, vol. 3631*:234–243 (Jan. 1999).

Chang, P.C.; Sriram, S.; Wey, A.C., "Multiple Fiber Interconnect Using Silicon V–Grooves," SPIE vol. 836 Optoelectronic Materials, Devices, Packaging and Interconnects (1987), pp. 311–318.

Murphy, Edmond J.; Rice, Trudie C., "Self–Alignment Technique for Fiber Attachment to Guided Wave Devices," IEEE Journal of Quantum Electronics, vol. QE–22, No. 6, Jun. 1986, pp. 928–932.

Newton, S.A.; Jackson, K.P.; Shaw, H.J., "Optical Fiber V–Groove Transversal Filter," Appl. Phys. Lett. 43 (2), Jul. 15, 1983.

\* cited by examiner

*Primary Examiner*—Ellen E. Kim
(74) *Attorney, Agent, or Firm*—J. Grant Houston

(57) ABSTRACT

Optical fiber endfaces are fixtured across a hermetic boundary from an optical system. Beams are transmitted between the system and the endfaces through a window structure in the walls of the hermetic package. A mounting block is used to secure the endfaces to a common bench. In one embodiment, a two-dimensional lens array is used.

10 Claims, 6 Drawing Sheets

SYSTEM AND METHOD FOR COUPLING BEAMS INTO OPTICAL SYSTEM ACROSS HERMETIC BOUNDARY

RELATED APPLICATION

This application claims the benefit of the filing data of U.S. Provisional Application No. 60/165,431, filed Nov. 15, 1999, the teachings of which are incorporated herein by this reference in their entirety.

BACKGROUND OF THE INVENTION

A reoccurring challenge associated with the manufacture of optical systems concerns the coupling of the optical signals between the optical fibers used for transmission over distances and the optical devices that generate, detect, analyze and/or otherwise manipulate the optical signals. The source of the challenge is associated with the small beam sizes characteristic of the fiber optic systems. For example, the typical mode size of an optical signal traveling through single mode optical fiber is about ten micrometers ($\mu$m) in diameter.

Consider, for example, the problem of coupling an optical signal emitted from an optical signal port such as an endface of an optical fiber. The beam is typically diverging from the fiber. Therefore, some sort of aligned collimating/focusing optics is required to improve the collimation of the emitted beam or bring the beam to a waist in the optical system of the optical device. Contrastingly, when coupling optical signals from an optical system into an optical fiber, beam sizes of, for example, 100's of micrometers in diameter must be focused down to the approximately 10 $\mu$m diameter to be efficiently coupled into the fiber endface input port. Moreover, the beam spot must be aligned with the approximately 10 $\mu$m core of the optical fiber.

A further problem associated with manufacturing/packaging surrounds the sealing of optical system of the optical device. To ensure the long-term stability, optical systems are typically hermetically sealed. This requirement is especially true for active optical components, such as lasers due to their high-localized operating temperatures, for example. In the context of micro-optical electrochemical systems (MOEMS), hermetic sealing is required to ensure the continued operation of the devices.

The typical approach to solving the problem of hermetically sealing the optical system while providing for the transmission of the optical signal across the hermetic boundary is to insert an optical fiber through a fiber feedthrough in the hermetic package and then secure the endface of the optical fiber down onto a submount or bench in the packages. This allows for the control of optical beams propagating between the optical system and the optical signal port of the fiber endface because of the fixed relationship between the endface and the optical components of the optical system. Hermeticity is ensured by sealing the package fiber feedthrough around the optical fiber.

This conventional strategy for using the optical fiber to convey the optical signal across the hermetic boundary is common in optical systems providing low levels of integration. Optical systems typically have only one or two fiber pigtails. As a result, only a few fiber feedthroughs must be sealed.

SUMMARY OF THE INVENTION

This strategy for conveying the optical signals across the hermetic boundary becomes unworkable, however, in modern wavelength division multiplexing (WDM) and dense wavelength division multiplexing (DWDM) systems. Such systems as WDM/DWDM switches, multplexers/demultiplexers, and add/drop devices typically require that many optical signals be brought into a single hermetically sealed package. Robust sealing is thus required for every fiber feedthrough port in the hermetic package.

Another problem associated with the use of fiber to transmit the optical signals across the hermetic boundaries surrounds the particular manufacturing requirements for commercial-grade fiber optic systems. Generally, there can be no residual organic compounds remaining in the hermetic package after its sealing. Thus, epoxies cannot be used to bond the optical elements, such as the fiber endfaces within the hermetic package. Moreover, any fluxes used during the manufacturing of the optical device must be rigorously cleaned from the package prior to lid sealing. Thus, the fiber endface fixturing techniques must be organics-free.

The present invention concerns a technique for fixturing optical fiber endfaces and transmitting optical signals across a hermetic boundary from an optical system, for which the optical fibers function as optical signal ports. The invention, however, also has relevance to applications where the function of the external optical signal port is provided by another optical system, without intervening fiber optics. Specifically, the optical signals are transmitted into and/or out of the optical system across the hermetic boundary as beams that are transmitted through a window structure in the walls of the hermetic package.

In general, according to one aspect, the invention features a system for coupling optical signal beams through a hermetic package of an optical device. The system comprises a device bench and a hermetic package surrounding an optical system that is installed on the bench. A fixture is used for securing optical signal ports to the bench outside of the hermetic package. A window structure is provided in the wall of the hermetic package that enables optical signal beams to be transmitted between the optical system that is inside of the hermetic package and external optical signal ports.

In the present embodiments, the optical signal ports are the optical fiber endfaces. These optical fiber endfaces can either be the source of the optical signal beams, such as where optical signal beams are entering the package to be switched to another optical fiber. IN other cases, the optical signal ports can receive the optical signals as in the case where a beam is emitted from the optical system after being switched, for example. In still other instances, the optical signal ports are bi-directional, both emitting and receiving optical signal beams.

Generally, however, the ports, rather than being fiber optic based, could be ports to another optical system. For example, two optical systems could be manufactured on a common bench, but separately sealed in their respective hermetic packages. Optical signal beams are transmitted through the inventive window structures between the separate systems.

According to the preferred embodiment, a lens array is used for coupling the optical signal beams between the optical signal ports and the optical system. Such lens arrays can be located outside the package as shown, or on the hermetically sealed side of the window structure. The lens arrays can be conveniently formed as a series of discrete lenses on a common substrate. This is preferably generated in a monolithic fashion. Further, these are preferably micro-optic structures having lens diameters of less than 1,000 micrometers. In the preferred embodiment, the lens diameters are about 200 to 500 micrometers or smaller.

In the preferred embodiment, the optical signal ports are endfaces of optical fibers. They are preferably secured to the bench in a fiber block. This block currently has a two-part construction with V-grooves for securing the optical fiber endfaces in a stable relationship relative to the bench and thus, the optical system.

On problem, especially with bi-directional systems surrounds back reflections from the fiber enfaces. In one embodiment, this problem is solved by forming wedge-shaped endfaces on the optical fibers. The resulting beam tilt can be solved with a beam tilt compensator that directs the beams to propagate parallel to the optical bench.

In general, according to another aspect, the invention also features a collimator for an optical device. This collimator comprises a substrate. A two-dimensional array of lenses is formed on the substrate. This allows the formation of two-dimensional arrays of beams, which are useful in modern tip/tilt mirror switching optical systems, for example.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
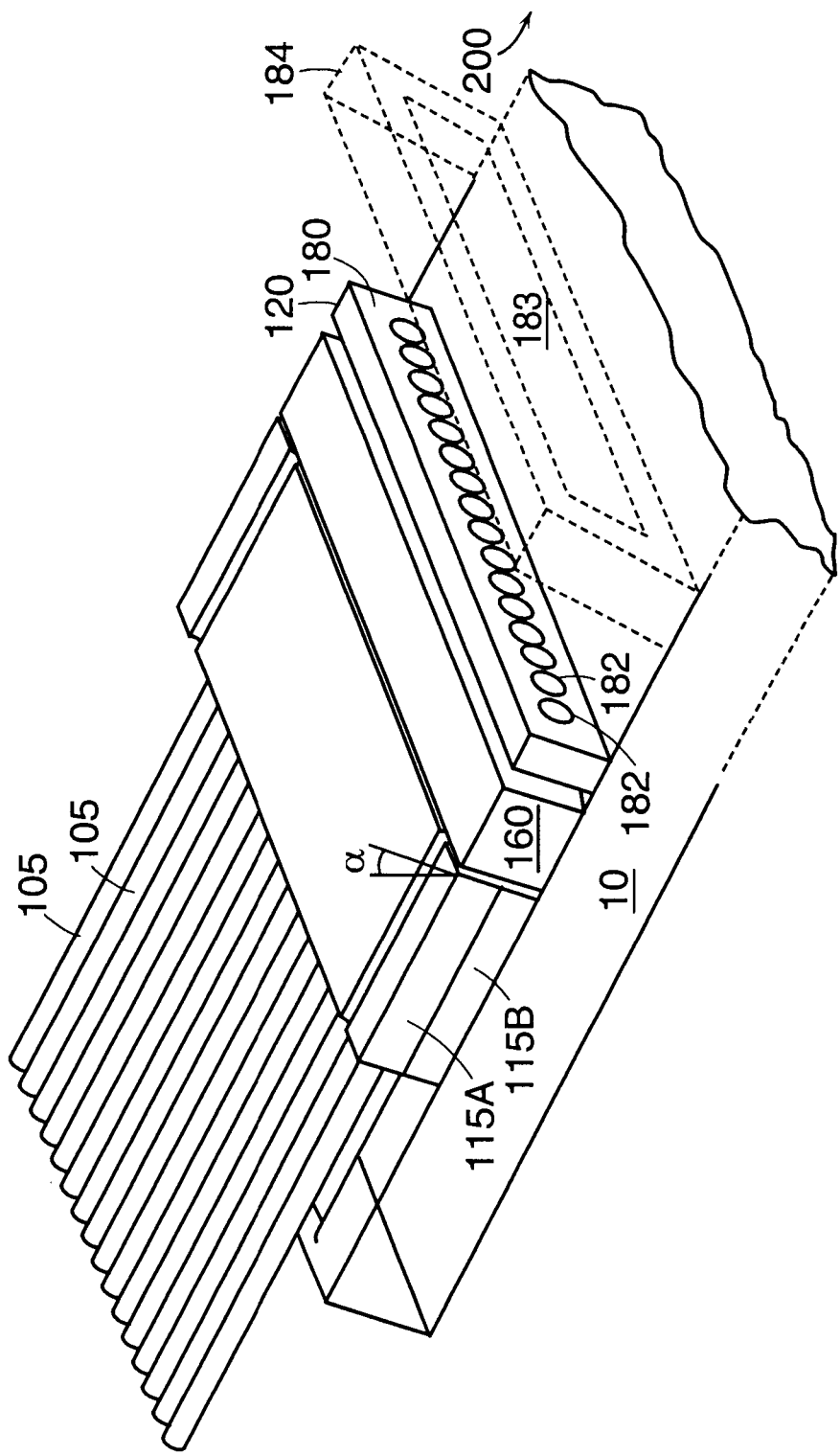
FIG. 1A is a perspective view showing a fiber optic device packaging system according to the present invention.

FIG. 1A shows a fiber optic device packaging system, which has been constructed according to the principles of the present invention.

Specifically, fibers 105 are secured to an optical bench 10 via a fiber mounting block 115. In one implementation, this block 115 is fabricated from separate silicon slabs having V-grooves for holding the fibers 105.

Figure 1B:
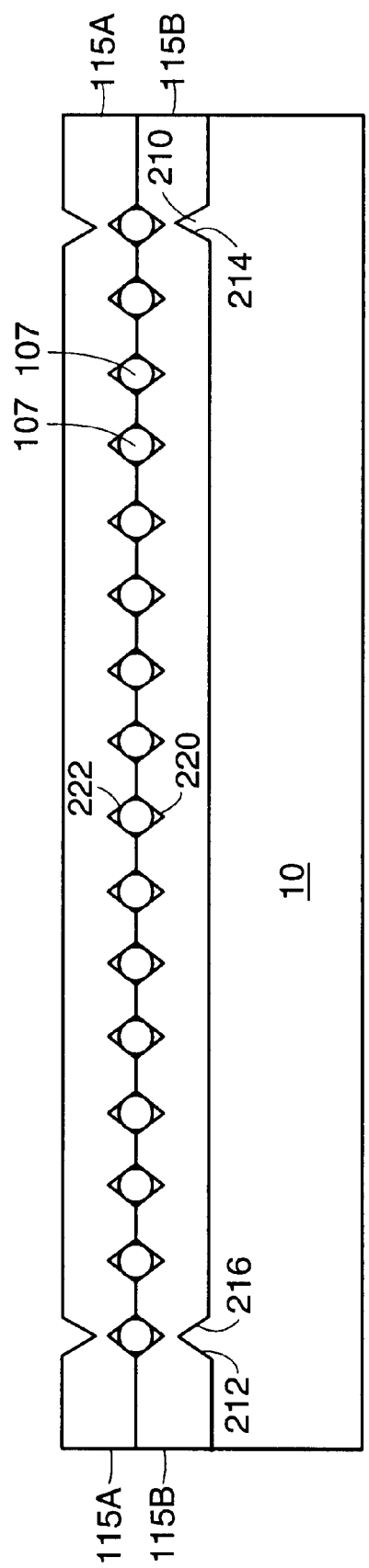
FIG. 1B is a front elevation view of the fiber mounting block according to the present invention.

FIG. 1B shows one embodiment of the mounting block 115 for securing the fiber endfaces 107 to the bench 10. Specifically, the fiber mounting block 115 comprises a lower section 115B and an upper section 115A. Matching V-grooves 220 and 222 are formed in the adjoining faces of the lower and upper sections 115B, 115A of the fiber mounting block 115. The fibers 105 are held in these V-grooves between the two sections of the block.

Especially in implementations where the fibers transmit optical signals bi-directionally, backreflections into the fiber endfaces 107 must be suppressed. One common way to improve backreflection suppression, in addition to antireflection (AR) coatings, is to cleave or polish the fiber endfaces 107 at an angle to form a wedge-shaped fiber lens.

Returning to FIG. 1A, according to the illustrated embodiment, the fibers 105 are secured in the block 115. The terminal of the fiber endfaces and preferably the block 115 is formed at an angle $\alpha$ with respect to line that is perpendicular to the axes of the fibers at the block 115. This angling is accomplished or manufactured by securing the fibers in the block and then polishing the block and fibers as a unit on a polishing wheel, for example.

In front of the optical mounting block 115, a beam tilt compensating block 160 is attached to the bench 10. The compensating block corrects the axes of the beams emitted from the tilted endfaces 107 of fibers 105 to redirect them in a plane that is parallel to the surface of the bench 110.

Downstream of the tilt compensating block 160 is a collimator array 120. Typically, light exiting from cleaved fiber endface diverges at a half angle rate of about 6 degrees, in the case of some single mode fibers. The collimator array 120 converts that the diverging beams into a collimated or to a beam that has a lower rate of divergence or a beam waist.

The collimator array 120 preferably comprises a substrate 180 and discrete lenses 182 formed on the substrate. In the preferred embodiment, the discrete lenses 182 are manufactured on the substrate 180 using the mass transport process as described in U.S. Pat. No. 5,618,474, which is incorporated herein by this reference in its entirety. The substrate is typically gallium phosphide or silicon, for example.

The advantage of this approach, in contrast to other lens systems, surrounds the fact that the array of lenses 182 is lithographically manufactured. Thus, the tolerances associated with the lens spacings and curvatures are lithographically controllable. Similarly, the V-grooves formed in the fiber mounting block 115 are also preferably lithographically manufactured. The result is that high levels of passive alignment are achieved with the present invention between the lenses and the fiber endfaces.

The optical signal beams that are either coupled into the fiber endfaces 107 and/or are emitted from the fiber endfaces 107 are transmitted to the optical system 200 of the optical device through a window structure 183 in a sidewall of a hermetic package 184 surrounding the optical system 200. In the illustrated embodiment, the hermetic package 184 is sealed down onto the optical bench 10 during normal operation. These hermetic packages are typically made from a temperature stable metal or ceramic. The window structure is preferably transparent to the wavelength of operation of the optical signal beams. This allows the optical signal beams to be transmitted into and out of the optical system 200 across the hermetic boundary defined by the hermetic package 184.

Of note is the fact that the optical fiber endfaces 107 and/or optical block 115 are themselves hermetically sealed in a separate larger package, now shown. The relevance of the invention concerns the fact that the fiber endfaces are separated by a hermetic boundary (see reference 184) from the optical system 200. This configuration yields advantages based on the fact that the fiber endfaces can be attached to the bench 10 using fixturing techniques that are generally incompatible with commercial optical systems. For example, the fiber endfaces are secured to the bench 10 using epoxies, in some embodiments, even though the optical system 200 may have active devices that could be damaged by exposure to the organic compounds that epoxies will outgas over time.

Figure 2:
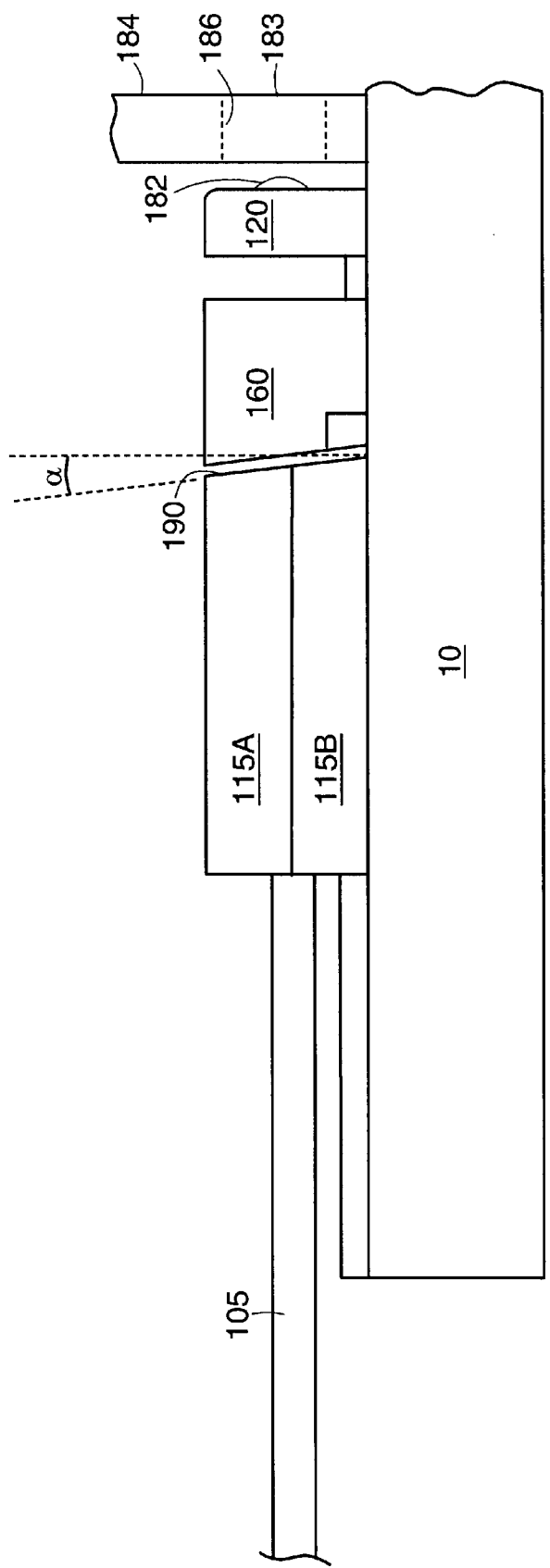
FIG. 2 is a side elevation view showing the fiber optic device packaging system according to the present invention.

FIG. 2 is a side view showing the optical train associated with the fiber optic block 115, the beam tilt compensating block 160, the collimator array 120, and the side wall 184 of the hermetic package in which the window structure 183 is installed in a feedthrough 186 in the hermetic package sidewall. This view best illustrates the endface angling of the fiber endfaces proximal side 190 of the collimator block 115.

Figure 3:
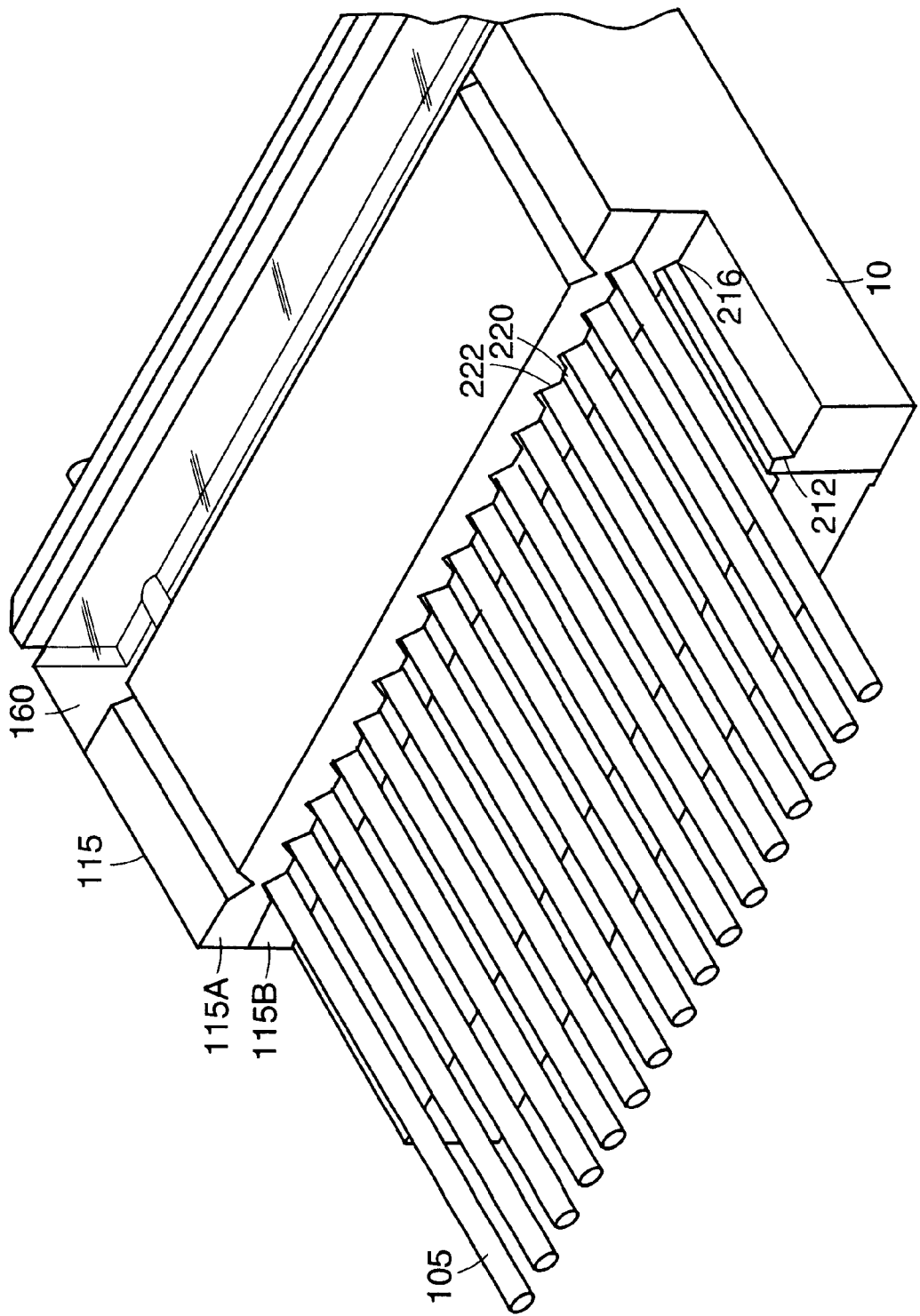
FIG. 3 is a reverse angle perspective view showing the attachment of the optical fibers to a bench according to the present invention.

FIG. 3 shows a reverse angle with the separate optical fibers 105 entering into the rear side of the mounting block 115. Also shown is the bench/block alignment feature. Specifically, a V-shaped projections 210 is formed in a top surface of the bench. This mates with a slot 216 in the underside of the lower section 115B of the block 115. More specifically, V-shaped projections 210, 212 are formed in the top surface of the bench 10. These mate with V-shaped slots 214, 216 on the underside of the bottom section 115B of the block 115 (see also FIG. 1B). As a result, the fiber mounting block can be installed with a stable relationship to the bench 10. Thus, the fiber endfaces have a fixed location to the bench. Moreover, since these features can be lithographically formed, replacement accuracy can be very good.

Figure 4:
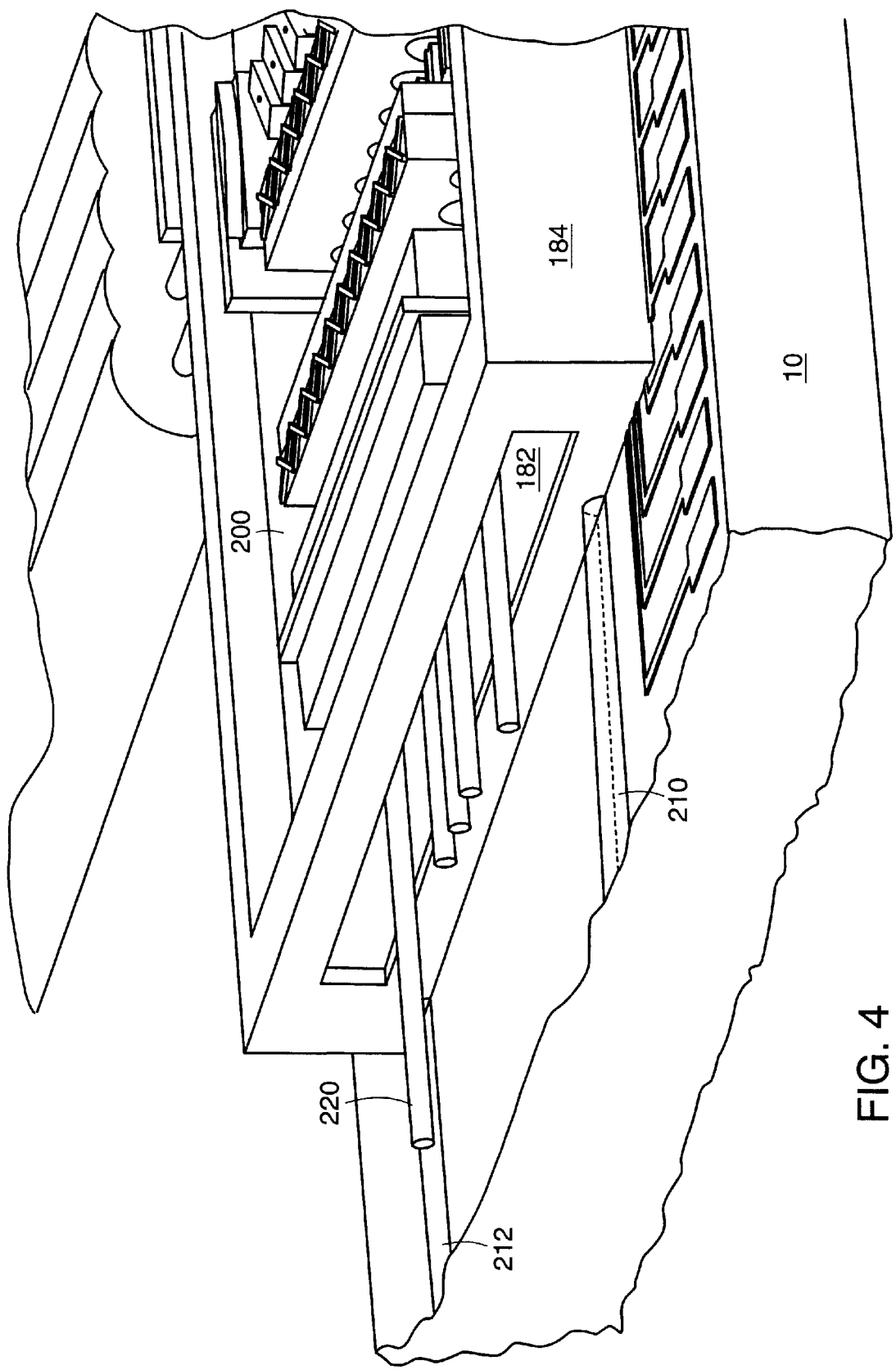
FIG. 4 is a perspective view showing the window structure in a hermetic package according to the present invention.

FIG. 4 shows the optical system 200 and the hermetic package with the fiber mounting block removed to illustrate the details of the window structure 183. Specifically, in the illustrated embodiment, a rectangular window structure is formed in a sidewall of the hermetic package 184. Thus, optical signal beams 220 can be transmitted across the hermetic boundary defined by hermetic package 184, to and from the optical system 200.

According to another aspect of the preferred embodiment, the V-shaped alignment features 210, 212 of the bench 10 extend across the hermetic boundary defined by the package 184. As a result, these V-shaped ridges can define the alignment between the optical fibers that are external to the package and the internal optical elements of the optical system 200.

Figure 5:
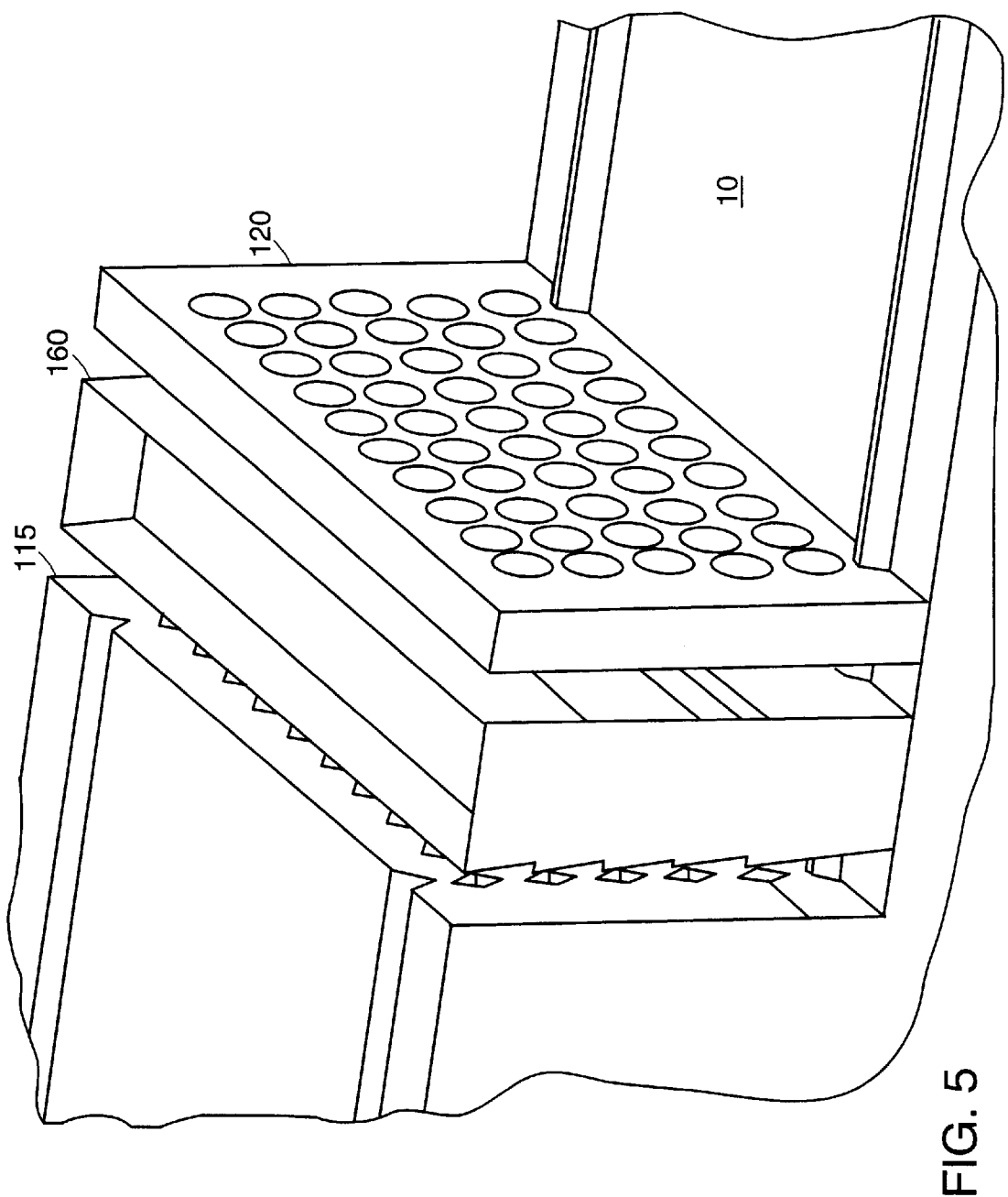
FIG. 5 is a perspective view of a two-dimensional embodiment of the fiber optic device packaging system according to the present invention.

FIG. 5 is a perspective view showing the details of a two-dimensional fiber mounting block 115, two dimensional tilt compensator 160, and a two-dimensional collimator lens array 120. In this second illustrated embodiment, a stack of off-angle wedge blocks are used as the tilt compensators for beam tilt created from angled endfaces of the fibers 105.

The collimator block 120 comprises an array of discrete collimator lenses 165. The 5×10 array of fibers held in the fiber block 115 is mirrored in a corresponding 5×10 array of discrete lens 182 in the collimator block 120.

According to the preferred embodiment, the discrete lenses 165 are formed on a single substrate 120 using the mass transport process as described previously. The substrate is then bonded to the bench 110 such that it projects vertically from the bench. The lens sizes are preferably less than 1000 micrometers in diameter, and typically less than 500 micrometers.

In a different implementation, the curvatures of the lenses are selected in combination with the off-axis centering of each lens relative to its corresponding fiber to compensate for the optical axis tilt created by the wedge fiber endfaces. This configuration avoids the need for the beam tilt compensating block 160.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for coupling optical signal beams through a hermetic package of an optical device, the system comprising:

a device bench;

a hermetic package surrounding an optical system that is installed on the bench;

a fixture for securing optical signal ports to the bench outside of the hermetic package;

a window structure in a wall of the hermetic package enabling optical signal beams to be transmitted between an inside of the hermetic package and the optical signal ports; and a lens array substrate, separated from the window structure, the lens array substrate comprising lenses for coupling the optical signal beams between the optical signal ports and the optical system.

2. A system as claimed in claim 1, wherein the lens array substrate comprises:

a series of lenses formed on the substrate.

3. A system as claimed in claim 2, wherein the lenses and the substrate form a monolithic component.

4. A system as claimed in claim 2, wherein each of the lenses is less than 1000 micrometers in diameter.

5. A system as claimed in claim 2, wherein each of the lenses is less than 500 micrometers in diameter.

6. A system as claimed in claim 1, wherein the lens array substrate comprises:

a two-dimensional array of lenses formed on the substrate.

7. A system as claimed in claim 1, wherein the fixture comprises a fiber block for securing endfaces of optical fibers to the bench, the endfaces functioning as the optical signal ports.

8. A system as claimed in claim 7, wherein the endfaces are wedge shaped.

9. A system as claimed in claim 8, further comprising a beam tilt compensator installed on the bench between the fiber block and optical system to direct beams to propagate between the endfaces and the optical system.

10. A system for coupling optical signal beams through a hermetic package of an optical device, the system comprising:

bench means;

package means surrounding an optical system that is installed on the bench means;

fixture means for securing optical signal ports to the bench means outside of the package means; and window means in wall of the package means enabling optical signal beams to be transmitted between an inside of the package means and the optical signal ports; and a lens array, separated from the window means, for coupling the optical signal beams between the optical signal ports and the optical system.

* * * * *